US008885966B2

(12) United States Patent
Hirono (10) Patent No.: US 8,885,966 B2
(45) Date of Patent: Nov. 11, 2014

(54) APPARATUS, METHOD AND PROGRAM FOR PERFORMING A PLURALITY OF PROCESSES ON AN IMAGE SIGNAL

(75) Inventor: Ryo Hirono, Kanagawa (JP)

(73) Assignee: Sony Corporation (JP)

( * ) Notice: Subject to any disclaimer, the term of this patent is extended or adjusted under 35 U.S.C. 154(b) by 161 days.

(21) Appl. No.: 13/333,105

(22) Filed: Dec. 21, 2011

(65) Prior Publication Data

US 2012/0170872 A1 Jul. 5, 2012

(30) Foreign Application Priority Data

Dec. 29, 2010 (JP) ................................ P2010-294423

(51) Int. Cl.
*G06K 9/40* (2006.01)
*H04N 5/21* (2006.01)
*H04N 5/205* (2006.01)

(52) U.S. Cl.
CPC . *H04N 5/21* (2013.01); *H04N 5/205* (2013.01)
USPC .......................................... 382/260; 382/274

(58) Field of Classification Search
USPC ......... 382/167–168, 190, 199, 260–266, 274; 358/1.9, 460, 520, 504, 523, 518, 461, 358/455; 345/600–604
See application file for complete search history.

(56) References Cited

U.S. PATENT DOCUMENTS

| | | | | |
|---|---|---|---|---|
| 5,051,842 A * | 9/1991 | Shimazaki | ..................... | 358/447 |
| 6,628,842 B1 * | 9/2003 | Nagao | ........................... | 382/266 |
| 6,801,339 B1 * | 10/2004 | Ito | ................................ | 358/3.26 |
| 6,931,160 B2 * | 8/2005 | Gindele et al. | ................ | 382/261 |
| 6,965,416 B2 * | 11/2005 | Tsuchiya et al. | .............. | 348/606 |
| 7,054,501 B1 * | 5/2006 | Gindele et al. | ................ | 382/266 |
| 7,092,579 B2 * | 8/2006 | Serrano et al. | ................ | 382/254 |
| 7,570,831 B2 * | 8/2009 | Shaked et al. | ................ | 382/260 |
| 7,995,857 B2 * | 8/2011 | Wang | ............................ | 382/266 |
| 8,000,551 B2 * | 8/2011 | Arici et al. | ..................... | 382/260 |
| 8,160,382 B2 * | 4/2012 | Sefcik | ............................. | 382/266 |
| 8,175,408 B2 * | 5/2012 | Hagiwara | ..................... | 382/266 |
| 2005/0094890 A1 * | 5/2005 | Wang | ............................ | 382/266 |

FOREIGN PATENT DOCUMENTS

JP 2005-354534 A 12/2005

OTHER PUBLICATIONS

Fabrizio Russo, An Image Enhancement Technique Combining Sharpening and Noise Reduction, IEEE Transactions on Instrumentation and Measurement, vol. 51, No. 4, Aug. 2002.*

* cited by examiner

*Primary Examiner* — Andrae S Allison
(74) *Attorney, Agent, or Firm* — Lerner, David, Littenberg, Krumholz & Mentlik, LLP (57) ABSTRACT

An image processing apparatus may have an information management unit that manages image information and control information for each image process, an analysis unit that analyzes an input image signal, a first processing unit that performs a first image process on the input image signal based on first control information, and a second processing unit that performs a second image process on an image signal on which the first processing unit has performed an image process based on second control information, wherein the information management unit sets image information that corresponds to the input image signal and the first control information based on an analysis result, updates the image information based on the set first control information, and sets the second control information based on the updated image information and the first control information.

7 Claims, 6 Drawing Sheets

FIG. 2A

| IMAGE INFORMATION | NOISE LEVEL (0: NONE – 100: MAX NOISE LEVEL) | 70 |
|---|---|---|
| | HIGH-PASS FREQUENCY COMPONENTS (0: NONE – 100: MAX HIGH-PASS COMPONENTS) | 60 |
| CONTROL INFORMATION | NOISE REDUCTION (0: OFF – 100: MAX STRENGTH) | – |
| | SHARPNESS (0: OFF – 100: MAX STRENGTH) | – |

FIG. 2B

| IMAGE INFORMATION | NOISE LEVEL (0: NONE – 100: MAX NOISE LEVEL) | 70 → 10 |
|---|---|---|
| | HIGH-PASS FREQUENCY COMPONENTS (0: NONE – 100: MAX HIGH-PASS COMPONENTS) | 60 → 50 |
| CONTROL INFORMATION | NOISE REDUCTION (0: OFF – 100: MAX STRENGTH) | 70 |
| | SHARPNESS (0: OFF – 100: MAX STRENGTH) | – |

FIG. 2C

| IMAGE INFORMATION | NOISE LEVEL (0: NONE – 100: MAX NOISE LEVEL) | 10 → 15 |
|---|---|---|
| | HIGH-PASS FREQUENCY COMPONENTS (0: NONE – 100: MAX HIGH-PASS COMPONENTS) | 50 → 70 |
| CONTROL INFORMATION | NOISE REDUCTION (0: OFF – 100: MAX STRENGTH) | 70 |
| | SHARPNESS (0: OFF – 100: MAX STRENGTH) | 50 |

FIG. 3

| IMAGE INFORMATION | NOISE LEVEL (0: NONE – 100: MAX NOISE LEVEL) | 70 →70 (10 →10) |
|---|---|---|
| | HIGH-PASS FREQUENCY COMPONENTS (0: NONE – 100: MAX HIGH-PASS COMPONENTS) | 60 →65 (50 →55) |
| CONTROL INFORMATION | NOISE REDUCTION (0: OFF – 100: MAX STRENGTH) | – |
| | SHARPNESS (0: OFF – 100: MAX STRENGTH) | 20 |

FIG. 4A

| IMAGE INFORMATION | NOISE LEVEL (0: NONE – 100: MAX NOISE LEVEL) | 10 |
|---|---|---|
| | HIGH-PASS FREQUENCY COMPONENTS (0: NONE – 100: MAX HIGH-PASS COMPONENTS) | 50 |
| CONTROL INFORMATION | NOISE REDUCTION (0: OFF – 100: MAX STRENGTH) | – |
| | SHARPNESS (0: OFF – 100: MAX STRENGTH) | – |

FIG. 4B

| IMAGE INFORMATION | NOISE LEVEL (0: NONE – 100: MAX NOISE LEVEL) | 10 → 10 |
|---|---|---|
| | HIGH-PASS FREQUENCY COMPONENTS (0: NONE – 100: MAX HIGH-PASS COMPONENTS) | 50 |
| CONTROL INFORMATION | NOISE REDUCTION (0: OFF – 100: MAX STRENGTH) | 0 |
| | SHARPNESS (0: OFF – 100: MAX STRENGTH) | – |

FIG. 4C

| IMAGE INFORMATION | NOISE LEVEL (0: NONE – 100: MAX NOISE LEVEL) | 10 → 20 |
|---|---|---|
| | HIGH-PASS FREQUENCY COMPONENTS (0: NONE – 100: MAX HIGH-PASS COMPONENTS) | 50 → 90 |
| CONTROL INFORMATION | NOISE REDUCTION (0: OFF – 100: MAX STRENGTH) | 0 |
| | SHARPNESS (0: OFF – 100: MAX STRENGTH) | 70 |

FIG. 5

| | IMAGE INFORMATION 1 | |
| --- | --- | --- |
| IMAGE INFORMATION | IMAGE INFORMATION 2 | |
| | ⋮ | ⋮ |
| | IMAGE INFORMATION N | |
| CONTROL INFORMATION | CONTROL INFORMATION 1 | |
| | CONTROL INFORMATION 2 | |
| | ⋮ | ⋮ |
| | CONTROL INFORMATION N | |

APPARATUS, METHOD AND PROGRAM FOR PERFORMING A PLURALITY OF PROCESSES ON AN IMAGE SIGNAL

CROSS-REFERENCE TO RELATED APPLICATION

The present application claims priority from Japanese Patent Application No. JP 2010-294423 filed in the Japanese Patent Office on Dec. 29, 2010, the entire content of which is incorporated herein by reference.

BACKGROUND

The present disclosure relates to an image processing apparatus, an image processing method, and a program.

In recent years, the capabilities of image processing apparatuses that are able to process image signals such as, for example, television sets, have been increasingly improving, and among such image processing apparatuses, there are image processing apparatuses with a plurality of image processing functions to improve image quality.

Against such a background, techniques of improving image quality are being developed. For example, Japanese Unexamined Patent Application Publication No. 2005-354534 is exemplified as a technique of optimizing a plurality of noise reduction processes according to the preferences of the user and the types of image signals.

SUMMARY

In a case when performing a plurality of image processes on an image signal that represents an image (still image or moving image, hereinafter, treated as the same), one image process that is performed may have an impact on other image processes. As cases where other image processes are affected, the cases below, for example, are exemplified.

By performing a noise reduction process (an example of image process) for reducing noise somewhat strongly, the noise is removed but the image is blurred. As a result, there is cause to perform a sharpness improvement process such as a sharpening process somewhat strongly in order to reduce the blurring on the image.

If a noise reduction process is performed somewhat weakly, noise is not sufficiently reduced, and the noise remains. As a result, there is cause to perform a sharpness improvement process (an example of image process) of the image such as the sharpening process somewhat weakly so that the noise is not noticeable.

Therefore, in order to improve image quality in a case when performing a plurality of image processes on an image signal, it is desirable to coordinate the plurality of image processes.

Here, with the technique of the related art for improving the image quality as illustrated in Japanese Unexamined Patent Application Publication No. 2005-354534 (hereinafter, may be referred to simply as "technique of the related art"), for example, a contour correction process and a noise reduction process are respectively performed at levels regulated in advance based on a combination of the format of the image signal and the image quality setting set by the user. Accordingly, since it is possible with the technique of the related art to coordinate a plurality of processes by performing each image process at levels regulated in advance, there is a possibility that it is possible to improve image quality to some extent by using the technique of the related art.

However, with the technique of the related art, since each image process is performed at levels that are regulated in advance based on a combination of the format of the image signal and the image quality setting set by the user, image processes are merely performed on the image signal using static settings. Accordingly, by using the technique of the related art, since it is difficult to change the setting of the image processes depending on, for example, the image or the scene of the image, it is difficult to perform image processes that are appropriate for the image signal.

Therefore, there is a concern that, even if the technique of the related art is used, it may not be possible to improve image quality in a case when a plurality of image processes are performed on the image signal.

It is desirable to provide a new and improved image processing apparatus with which it is possible to improve image quality in a case when a plurality of image processes are performed on an image signal, an image processing method, and a program.

According to an embodiment of the present disclosure, there is provided an image processing apparatus including: an information management unit that manages image information that indicates a state relating to the image quality of an image that an image signal represents and control information for each image process which regulates the degree of an image process; an analysis unit that analyzes an input image signal that is input; a first processing unit that performs a first image process on the input image signal based on first control information that is the corresponding control information; and a second processing unit that performs a second image process on an image signal on which the first processing unit has performed an image process based on second control information that is the corresponding control information, wherein the information management unit sets image information that corresponds to the input image signal and the first control information based on an analysis result by the analysis unit, updates the image information based on the set first control information, and sets the second control information based on the updated image information and the first control information.

By such a configuration, it is possible to improve image quality in a case when performing a plurality of image processes on an image signal.

Further, the information management unit may update the image information based on the set second control information.

Furthermore, the image processing apparatus may further include one or two or more processing units that perform an image process based on the corresponding control information at a latter stage of the second processing unit, wherein the information management unit may set control information that corresponds to a processing unit that performs an image process next based on image information that is updated based on control information that corresponds to a processing unit of an earlier stage and control information that corresponds to a processing unit of the earlier stage.

In addition, according to another embodiment of the present disclosure, there is provided an image processing method including: analyzing an input image signal that is input; setting image information that corresponds to the input image signal and indicates a state relating to the image quality of an image that an image signal represents and first control information that regulates the degree of a first image process based on an analysis result in the analyzing of the input image signal; performing a first image process on the input image signal based on the set first control information; updating the image information based on the set first control information; setting second control information that regulates the degree of a second image process based on the updated image information and the first control information; and performing a second image process on an image signal on which the first image process has been performed based on set second control information.

By using such a method, it is possible to improve image quality in a case when performing a plurality of image processes on an image signal.

In addition, according to still another embodiment of the present disclosure, there is provided a program causing a computer to function as: an information management unit that manages image information that indicates a state relating to the image quality of an image that an image signal represents and control information for each image process which regulates the degree of an image process; an analysis unit that analyzes an input image signal that is input; a first processing unit that performs a first image process on the input image signal based on first control information that is the corresponding control information; and a second processing unit that performs a second image process on an image signal on which the first processing unit has performed an image process based on second control information that is the corresponding control information, wherein the information management unit sets image information that corresponds to the input image signal and the first control information based on an analysis result by the analysis unit, updates the image information based on the set first control information, and sets the second control information based on the updated image information and the first control information.

By using such a program, it is possible to improve image quality in a case when performing a plurality of image processes on an image signal.

According to the embodiments of the present disclosure, it is possible to improve image quality in a case when performing a plurality of image processes on an image signal.

DETAILED DESCRIPTION OF EMBODIMENTS

Favorable embodiments of the present disclosure will be described in detail below with reference to the attached drawings. Here, in the specification and the drawings, duplicate description is omitted for constituent elements with substantially the same functional configurations by conferring the same symbols.

Further, description will be given below in the following order.

1. Image Processing Apparatus According to Embodiments of Present Disclosure

2. Program According to Embodiment of Present Disclosure (Image Processing Apparatus According to Embodiments of Present Disclosure)

[Outline of Image Processing Method According to Embodiments of Present Disclosure]

Before describing a configuration of an image processing apparatus (hereinafter, may be referred to as an "image processing apparatus 100") according to the embodiments of the present disclosure, an outline of an image processing method according to an embodiment of the present disclosure will be described. Description will be given below with the image processing apparatus 100 performing processes according to the image processing method according to an embodiment of the present disclosure.

Further, in order to simplify the description, description will be given below of a case when the image processing apparatus 100 performs two image processes of a noise reduction process and a sharpening process. Here, the image processes that the image processing apparatus 100 according to the embodiments of the present disclosure performs are not limited to the noise reduction process and the sharpening process. For example, the image processing apparatus 100 according to the embodiments of the present disclosure is able to perform a variety of processes relating to the adjustment of the image quality such as, for example, a color adjustment process of adjusting the color or a contrast adjustment process of adjusting the brightness.

As described above, image quality is not necessarily able to be improved even if each image process is performed at a level regulated in advance based on the combination of the format of the image signal and the image quality setting set by the user as with the technique of the related art.

Further, image processing apparatuses such as television sets include those that are able to dynamically change the image processing mode or the image processing setting based on, for example, the result of analyzing information attached to an image such as meta-information or the image signal. With such an image processing apparatus of the related art as described above, since it is possible to dynamically change the settings and the like of image process depending on the image or the scene of the image, there is a possibility that it is possible to perform more flexible image processes than the technique of the related art. However, with such an image processing apparatus of the related art as described above, since it is difficult to perform processes in which a plurality of image processes are coordinated, it is difficult to be compatible with a case, for example, in which one image process that is performed as described above affects other image processes. Accordingly, image quality is not necessarily able to be improved even if such an image processing apparatus of the related art as described above is used.

Therefore, the image processing apparatus 100 according to an embodiment of the present disclosure improves the image quality by analyzing the image signal that is input (hereinafter, may be referred to as an "input image signal"), performing an image process according to the analysis result, and coordinating a plurality of image processes. More specifically, the image processing apparatus 100 coordinates a plurality of image processes by setting and updating image information that indicates a state relating to the image quality of an image that an image signal represents and control information that regulates the degree of image process that is performed on the image signal for each image process.

Here, although an image signal that the image processing apparatus 100 obtains as a result of, for example, receiving (directly or indirectly via a set-top box or the like) broadcast waves that are transmitted from a television tower or the like is exemplified as an input image signal according to the embodiments of the present disclosure, the input image signal according to the embodiments of the present disclosure is not limited to the above. For example, the image processing apparatus 100 is also able to process an image signal that is transmitted from an external device via a network (or directly) as the input image signal. Further, the image processing apparatus 100 may process an image signal obtained by decoding image data that is stored on an external recording medium that is detachable from the image processing apparatus 100 and a storage unit (be described later) as the input image signal.

Further, as the image information according to the embodiments of the present disclosure, for example, a value that indicates the level (degree) of noise in an image signal, a value that indicates the level (degree) of high-pass frequency components that are included in the image signal, or the like is exemplified. Furthermore, as the control information according to the embodiments of the present disclosure, a variety of values that indicate the degree of a variety of processes relating to the improvement of the image quality such as, for example, a value that indicates the degree of a noise reduction process or a value that indicates the degree of a sharpening process is exemplified. Here, needless to say, the image information and the control information according to the embodiments of the present disclosure are not limited to those described above.

As described above, since it is possible for one image process that is performed to affect other image processes, a state relating to the image quality of the image that an image signal represents is changed as image processes are performed. Therefore, the image process apparatus 100 first sets image information that corresponds to the analysis result of the input image signal. Next, the image processing apparatus 100 estimates the change in the state relating to the image quality in a case when one image process is performed and updates the image information according to the estimation result. Furthermore, the image processing apparatus 100 sets control information that corresponds to the image process that is performed next based on the updated image information and control information that corresponds to the one image process performed at the earlier stage.

By appropriately setting and updating the image information and the control information as described above, the image processing apparatus 100 is able to determine the degree of the image process to be performed next based not on the state relating to the image quality of the image that the input image signal represents but on a state relating to the image quality of the image that the most recent image signal represents in a case when an image process has been performed. Accordingly, since the image processing apparatus 100 is able to coordinate a plurality of image processes by appropriately setting and updating the image information and the control information as described above, it is possible to improve image quality in a case when a plurality of image processes are performed on an image signal.

An example of a configuration of the image processing apparatus 100 according to the embodiments of the present disclosure will be described below, and in addition, a specific example of a process according to the image processing method according to the embodiments of the present disclosure will also be described together.

[Configuration Example of Image Processing Apparatus According to Embodiments of Present Disclosure]

Figure 1:
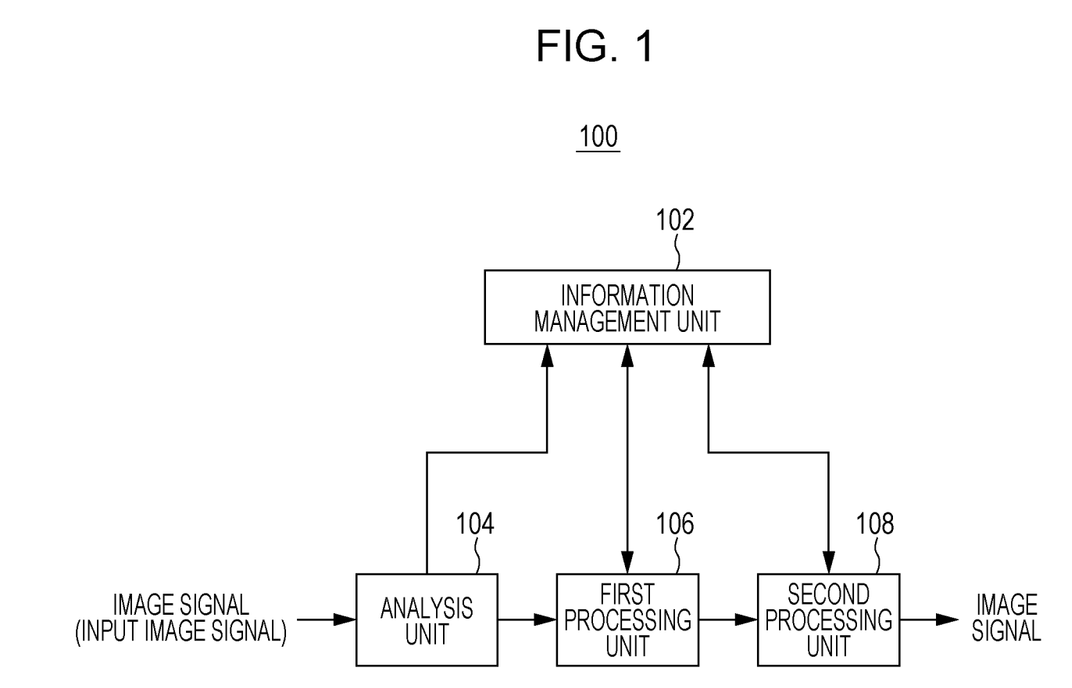
FIG. 1 is an explanatory diagram that illustrates an example of a configuration of an image processing apparatus according to the embodiments of the present disclosure.

FIG. 1 is an explanatory diagram that illustrates an example of a configuration of the image processing apparatus 100 according to the embodiments of the present disclosure. The image processing apparatus 100 includes, for example, an information management unit 102, an analysis unit 104, a first processing unit 106, and a second processing unit 108.

Further, the image processing apparatus 100 may include, for example, a control unit (not shown), a ROM (Read Only Memory; not shown), a RAM (Random Access Memory; not shown), a storage unit (not shown), an operation unit (not shown) that a user is able to operate, a display unit (not shown) that displays various types of screens on a display screen, a communication unit (not shown) for performing communication with an external apparatus, and the like. The image processing apparatus 100 connects each of the above constituent elements by, for example, a bus as a data transmission path.

Here, the control unit (not shown) is configured, for example, by an MPU (Micro Processing Unit) or various types of processing circuits and controls the entirety of the image processing apparatus 100. Further, the control unit (not shown) is also able to act, for example, as the information management unit 102. Furthermore, the control unit (not shown) may act to perform a process on an image signal on which various image processes such as, for example, encoding an image signal on which the second processing unit 108 has performed an image process and recording the image signal in the storage unit (not shown).

The ROM (not shown) stores control data such as programs that the control unit (not shown) uses or operation parameters. The RAM (not shown) temporarily stores programs that are executed by the control unit (not shown) or the like.

The storage unit (not shown) is a storage unit that the image processing apparatus 100 includes and stores a variety of types of data such as, for example, image data and applications. Here, as the storage unit (not shown), for example, magnetic recording media such as a hard disk, non-volatile memories such as an EEPROM (Electrically Erasable and Programmable Read Only Memory) or a flash memory, or the like is exemplified.

As the operation unit (not shown), for example, rotary selectors such as buttons, arrow keys, or a jog dial, or a combination thereof is exemplified. Further, as the display unit (not shown), for example, a liquid crystal display (LCD), an organic EL display (organic Electro Luminescence display, also referred to as an OLED display (Organic Light Emitting Diode display)), or the like is exemplified. The display unit (not shown) may also be a device with which display and user operations are possible such as, for example, a touch screen. Further, the image processing apparatus 100 is also able to be connected to an operation input device (for example, a keyboard or a mouse) as an external apparatus of the image processing apparatus 100, or an external display device.

The communication unit (not shown) is a communication unit that the image processing apparatus 100 includes, and performs wireless or wired communication with external apparatuses via a network (or directly). Here, as the communication unit (not shown), for example, a communication antenna and an RF (Radio Frequency) circuit (wireless communication), an IEEE 802.15.1 port and a transceiving circuit (wireless communication), an IEEE 802.11b port and a transceiving circuit (wireless communication), a LAN (Local Area Network) terminal and a transceiving circuit (wired communication), or the like is exemplified. Further, as a network according to the embodiments of the present disclosure, for example, wired networks such as a LAN or a WAN (Wide Area Network), wireless networks such as a wireless WAN (WWAN; Wireless Wide Area Network) via a base station, or the Internet using a communication protocol such as TCP/IP (Transmission Control Protocol/Internet Protocol), or the like is exemplified.

An example of the processes of the image processing apparatus 100 (processes according to the image processing method) will be described below with the image processing apparatus 100 illustrated in FIG. 1 as an example. Further, an example in a case when the first processing unit 106 performs a noise reduction process (an example of the first image process) and the second processing unit 108 performs a sharpening process (an example of the second image process) will be described below.

The information management unit 102 acts to manage the image information and the control information for each image process. Here, in the image processing apparatus 100, although the control unit (not shown), for example, is able to act as the information management unit 102, the configuration of the image processing apparatus 100 is not limited to the above. For example, the image processing apparatus 100 is also able to include an information management unit 102 that is configured by a separate processing circuit from the control unit (not shown). Further, as the management of the image information and the control information by the information management unit 102, for example, newly creating image information and control information, updating the contents indicated by the image information and the contents indicated by the control information (setting and updating of the image information and control information), deleting the image information and the control information, and the like is exemplified.

Although the information management unit 102 respectively manages the image information and the control information stored in the storage unit (not shown), for example, the image information and the control information that the information management unit 102 manages are not limited to the above. For example, the information management unit 102 is able to manage image information and control information that are stored on a recording medium that configures the information management unit 102, and further, it is also possible to manage the image information and the control information that are stored on an external apparatus by performing communication with the external apparatus via the communication unit (not shown). Here, although a non-volatile memory such as a flash memory, for example, is exemplified as the recording medium that configures the information management unit 102, the recording medium that configures the information management unit 102 is not limited to the above. For example, the image processing apparatus 100 may include volatile memories such as an SDRAM (Synchronous Dynamic Random Access Memory) or an SRAM (Static Random Access Memory) as a recording medium that configures the information management unit 102.

The analysis unit 104 analyzes an input image signal that is input and transmits the analysis result to the information management unit 102. Further, the analysis unit 104 transmits the input image signal to the first processing unit 106. Here, although a configuration in which the input image signal is transmitted to the first processing unit 106 via the analysis unit 104 is illustrated in FIG. 1, the configuration of the image processing apparatus 100 is not limited to the above. For example, in the image processing apparatus 100, it is possible to adopt a configuration in which the input image signal is directly input to the first processing unit 106 without passing through the analysis unit 104.

Here, as the analysis of the input image signal which the analysis unit 104 performs, analyses of items relating to the processes performed by each of the processing units such as, for example, detection of the noise level or detection of the high-pass frequency components is exemplified. More specifically, for example, the analysis unit 104 transmits the level of the S/N ratio (Signal to Noise ratio) that is calculated by calculating the S/N ratio as the detection value that indicates the noise level to the information management unit 102. Here, the level of the S/N ratio is calculated by setting, for example, the upper limit value of the S/N ratio set in advance to "100" and a state in which there is no noise to "0". Further, the analysis unit 104 transmits, for example, the level of the integrated value of the image signal that passes through a high-pass filter as the detection value that indicates the level of the high-pass frequency components to the information management unit 102. Here, the level of the high-pass frequency components is calculated by setting, for example, the upper limit value of the high-pass frequency components set in advance to "100" and a state in which there are no high-pass frequency components to "0".

Here, the detection values that the analysis unit 104 transmits to the information management unit 102 are not limited to the above. For example, the analysis unit 104 is not limited to the level of the S/N ratio, and is able to transmit the level of an arbitrary value that indicates the noise as the noise level to the information management unit 102. Further, the analysis unit 104 may transmit the integrated value itself of the S/N ratio and the image signal that has passed through a high-pass filter to the information management unit 102. In the above case, the information management unit 102 calculates the noise level or the level of the high-pass frequency components.

Further, the analysis unit 104 is able to be realized, for example, by the items to be analyzed or hardware of an arbitrary configuration according to the detection values that are transmitted to the information management unit 102. Such hardware may be specialized hardware or general-purpose hardware that is shared with other processes.

Once a detection value is transmitted from the analysis unit 104, the information management unit 102 generates, for example, image information and control information and sets the detection value (or a value based on the detection value) as the image information. Here, for example, in a case when there is template data of the image information and the control information, the information management unit 102 may not newly generate the image information and the control information.

Figure 2A:
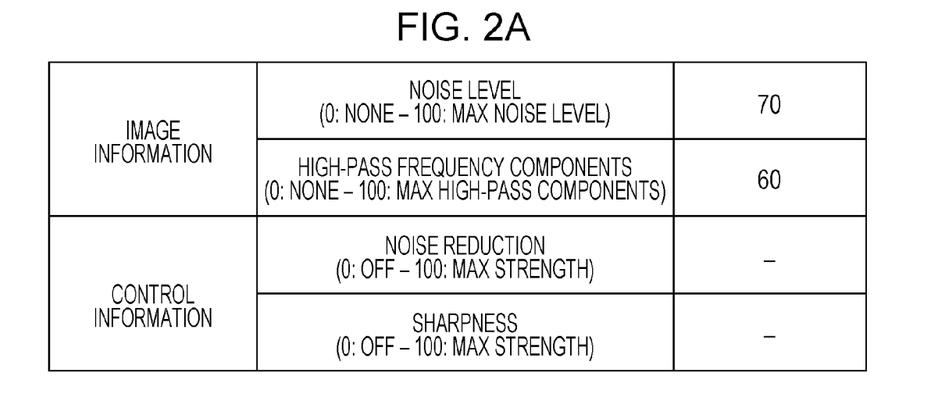
FIG. 2A is an explanatory diagram that illustrates an example of image information and control information according to the embodiments of the present disclosure.

FIG. 2A is an explanatory diagram that illustrates an example of image information and control information according to the embodiments of the present disclosure. Here, FIG. 2A illustrates an example of the image information and the control information that the information management unit 102 generates and sets as a result of the detection values indicating a noise level of "70" and a high frequency component level of "60" being transmitted. Here, needless to say, the image information and the control information according to the embodiments of the present disclosure are not limited to the example illustrated in FIG. 2A.

As described above, in a case when a noise reduction process (an example of an image process) is performed by the first processing unit 106, it is conceivable that the state of the image that the input image signal represents is changed by the noise reduction effect. The information management unit 102 therefore sets control information (hereinafter, referred to as "first control information") that regulates the degree of the image process by the first processing unit 106 by performing, for example, the operation of the below Formula 1 based on the image information set based on the analysis result by the analysis unit 104. Here, for example, the "noise reduction" of the control information illustrated in FIG. 2A is equivalent to the first control information according to the embodiments of the present disclosure (the same is also true of other drawings relating to the control information).

$$\text{Noise reduction score[0 to 100]}=(\text{gain 1})\times(\text{noise reduction strength[0-15]})\times 100/15 \quad \text{Formula 1}$$

Here, the noise reduction score shown in Formula 1 is the value of the first control information. The information management unit 102 specifies to which level of a plurality of levels (corresponding to the noise reduction strength of Formula 1) that are regulated in advance the value of the noise level included in the image information is equivalent. Here, an example in which Formula 1 is regulated by noise reduction strengths in 16 levels is shown. Further, the information management unit 102 uniquely specifies a gain 1 (parameter) according to the noise reduction strength using, for example, a lookup table in which the noise reduction strength and the gain 1 are associated. Furthermore, the information management unit 102 calculates the noise reduction score by performing the operation of Formula 1 and sets the first control information. Here, the setting method of the first control information in the image processing apparatus 100 according to the embodiments of the present disclosure is not limited to the above. For example, the image processing apparatus 100 according to the embodiments of the present disclosure is able to set the operation method or the parameters based on the performances of the image processes of each of the processing units, the image quality setting policy, or the like. Further, the lookup table according to the embodiments of the present disclosure may, for example, be stored in the storage unit (not shown) or may be stored in a recording medium in a case when the information management unit 102 includes a recording medium.

Once the first control information is set, the information management unit 102 estimates a state relating to the image quality of the image that the image signal represents in a case when the first processing unit 106 performs a noise reduction process based on the set first control information.

More specifically, for example, the information management unit 102 updates the image information by adding the increase or decrease amount of the noise level (the noise score increase or decrease amount shown in Formula 2) that is obtained by performing the operation shown in Formula 2 below to the value of the noise level that is set in the image information. Further, also with regard to the level of the high-pass frequency components, the information management unit 102 updates the image information by performing, for example, the same operation as Formula 1 and Formula 2 below and adding the increase or decrease amount of the level of the high-pass frequency components which is obtained to the value of the level of the high-pass frequency components which is set in the image information.

$$\text{Noise level score increase or decrease amount[-100 to +100]}=-\text{gain 2}\times(\text{noise reduction score}) \quad \text{Formula 2}$$

Here, the information management unit 102 uniquely specifies a gain 2 (parameter) according to the noise reduction score using, for example, a lookup table in which the noise reduction score and the gain 2 are associated. Furthermore, the information management unit 102 calculates the noise score increase or decrease amount by performing the operation of Formula 2 and updates the image information. Here, the updating method of the image information in the image processing apparatus 100 according to the embodiments of the present disclosure is not limited to the above. For example, the image processing apparatus 100 according to the embodiments of the present disclosure is able to set the operation method or the parameters based on the performances of the image processes of each of the processing units, the image quality setting policy, or the like.

Figure 2B:
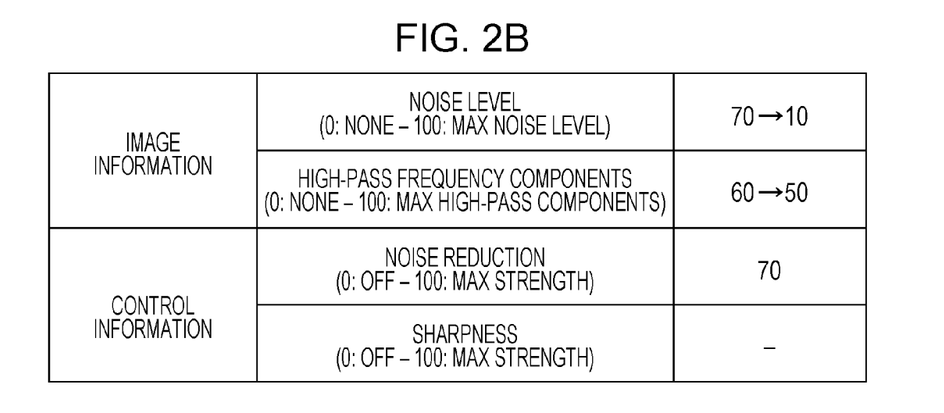
FIG. 2B is an explanatory diagram that illustrates an example of image information and control information according to the embodiments of the present disclosure.

FIG. 2B is an explanatory diagram that illustrates an example of the image information and the control information according to the embodiments of the present disclosure. FIG. 2B illustrates an example of the image information and the control information after the information management unit 102 updates the image information and the control information illustrated in FIG. 2A.

Here, the information management unit 102 performs an update of the image information and the control information by generating, for example, image information and control information that are separate from the image information and the control information illustrated in FIG. 2A. By the information management unit 102 performing an update of the image information and the control information by generating separate image information and control information, the image processing apparatus 100 is able to manage changes in the image information by a numerical value. The image processing apparatus 100 is therefore able to aid in the setting of the image quality. Further, for example, by presenting the changes in the image information by a graph or the like to the user of the image processing apparatus 100, the image processing apparatus 100 is able to notify of the control contents of the image processes relating to improving the image quality in the image processing apparatus 100 to be more easily understandable to the user. The image processing apparatus 100 is thereby able to improve convenience for the user by managing changes in the image information by a numerical value. Here, the processes by the information management unit 102 are not limited to the above. For example, the information management unit 102 is able to update the image information and the control information illustrated in FIG. 2A by overwriting.

The first processing unit 106 performs a noise reduction process (an example of an image process) on the input image signal based on the set first control information set by the information management unit 102. Furthermore, the first processing unit 106 transmits the image signal after the process to the second processing unit. Here, the first processing unit 106 and the information management unit 102 are able to perform processes independently. Therefore, in the image processing apparatus 100, it is possible to perform the image process by the first processing unit 106 and the updating process of the image information by the information management unit 102 in an arbitrary order.

Once the information management unit 102 performs setting of the first control information and an update of the image information, the control information (hereinafter, referred to as "second control information") that regulates the degree of the image process by the second processing unit 108 based on the updated image information and the first control information. Here, for example, the "sharpness" of the control information illustrated in FIG. 2A is equivalent to the second control information according to the embodiment of the present disclosure (the same is also true of other drawings relating to the control information).

More specifically, the information management unit 102 calculates how strongly (corresponding to the sharpness strength of Formula 3) the sharpening process is to be performed by performing the operation shown in Formula 3 below. Here, the user setting values shown in Formula 3 are set, for example, by using user interfaces such as the control unit (not shown) or an external operation device such as a remote controller. Although the information management unit 102 uses, for example, the values set by the user themselves (0 to 100) as the user setting values, the user setting values according to the embodiments of the present disclosure are not limited to the above. For example, the information management unit 102 is able to use a user setting value that is specified by uniquely specifying a user setting value that corresponds to a combination of the inputting type and the value set by the user by using a lookup table for each inputting type in which the value set by the user and the user setting value are associated (for example, when the value set by the user by a terrestrial digital broadcast input is "90", the user setting value is "80"). Further, the information management unit 102 uniquely specifies a gain 3 (parameter) according to the noise level recorded on the updated image information (most recent image information) by using, for example, a lookup table in which the noise level and the gain 3 are associated. Further, the information management unit 102 uniquely specifies a gain 4 (parameter) according to the noise reduction score recorded on the updated image information (most recent image information) by using, for example, a lookup table in which the noise reduction score and the gain 4 are associated.

Furthermore, the information management unit 102 sets the second control information by performing a similar operation to Formula 1 above using the calculated sharpness strength and uniquely using a gain 5 (parameter) that is specified using a lookup table in which the sharpness strength and the gain 5 are associated. Here, the setting method of the second control information by the image processing apparatus 100 according to the embodiments of the present disclosure is not limited to the above. For example, the image processing apparatus 100 according to the embodiments of the present disclosure is able to set the operation method or the parameters based on the performances of the image processes of each of the processing units, the image quality setting policy, or the like.

$$\text{Sharpness strength}[0 \text{ to } 100]=[\text{user setting value}](-\text{gain } 3)\times(\text{noise level})-(\text{gain } 4)\times(\text{noise reduction score}) \quad \text{Formula 3}$$

Further, once the second control information is set, the information management unit 102 estimates a state relating to the image quality of the image that the image signal represents in a case when the second processing unit 108 performs a sharpening process based on the set second control information. Here, the information management unit 102 performs the above estimation using the same method as the estimation method of the state relating to the image quality of the image that the image signal represents in a case when, for example, the noise reduction process described above is performed. Here, in a similar manner as the image processing apparatus 100 illustrated in FIG. 1, in a case when there are no other processing units that perform image processes at a latter stage of the second processing unit 108, the information management unit 102 may not estimate the state relating to the image quality of the image that the image signal represents in a case when a sharpening process is performed.

Figure 2C:
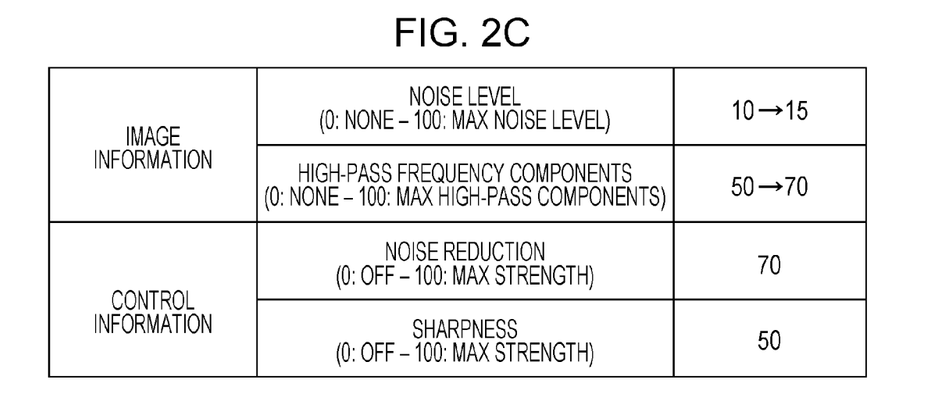
FIG. 2C is an explanatory diagram that illustrates an example of image information and control information according to the embodiments of the present disclosure.

FIG. 2C is an explanatory diagram that illustrates an example of the image information and the control information according to the embodiments of the present disclosure. FIG. 2C illustrates an example of image information and control information after the information management unit 102 updates the image information and the control information illustrated in FIG. 2B.

As described above, the image processing apparatus 100 sets a second control value based not on the state relating to the image quality of the image that the input image signal illustrated in FIG. 2A represents but on the state relating to the image quality of the image that the most recent image signal represents in a case when the image process as illustrated in FIG. 2B is performed. Therefore, as illustrated in FIG. 2C, for example, the image processing apparatus 100 is able to set the second control information for coordinating the first processing unit 106 and the second processing unit 108.

The second processing unit 108 performs a sharpening process (an example of an image process) on the image signal that is transmitted from the first processing unit 106 based on the second control information set by the information management unit 102. Furthermore, the second processing unit 108 outputs an image signal after the process. The image signal that is output from the second processing unit 108 may, for example, be encoded by the control unit (not shown) or may be transmitted to the display unit (not shown). Here, the second processing unit 108 and the information management unit 102 are able to perform processes independently. Therefore, in the image processing apparatus 100, the image process by the second processing unit 108 and the updating process of the image information by the information management unit 102 are able to be performed in an arbitrary order.

Figure 3:
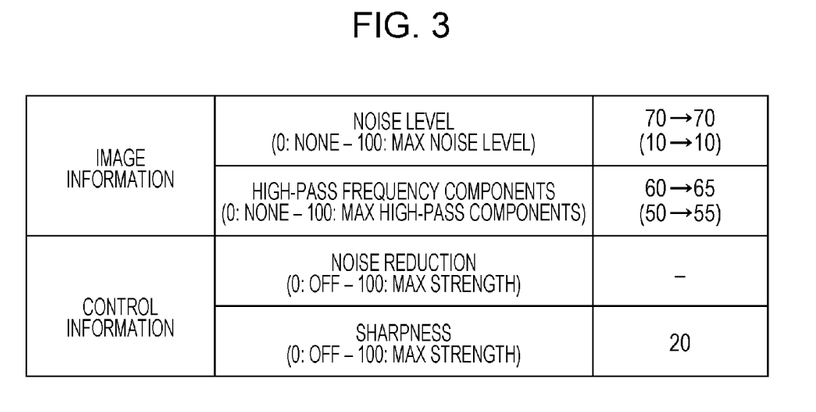
FIG. 3 is an explanatory diagram for describing a problem that may occur in a case when second control information is set based on a state that relates to the image quality of an image that an input image signal represents.

Here, in order to make the effects by the processes according to the image processing method according to the embodiments of the present disclosure clearer, similarly to the image processing apparatus of the related art which is not able to perform processes by coordinating a plurality of image processes (hereinafter, may be referred to simply as an "image processing apparatus of the related art"), a case when the image processing apparatus 100 sets the second control information based on the state relating to the image quality of the image that the input image signal as illustrated in FIG. 2A is set. FIG. 3 is an explanatory diagram for describing problems that may occur in a case when the second control information is set based on the state relating to the image quality of the image that the input image signal represents. FIG. 3 illustrates an example of the image information and the control information in a case when the image processing apparatus 100 sets the second control information based on the image information illustrated in FIG. 2A.

As illustrated in FIG. 2B, due to the noise reduction process by the first processing unit 106, the actual noise level of the image signal is changed from "70" to "10", and further, the actual level of the high frequency components of the image signal is also changed from "60" to "50". However, by the second control information illustrated in FIG. 3 being used by the second processing unit 108, in the second processing unit 108, the sharpening process is performed more weakly than a case when the second control information illustrated in FIG. 2C is used. Therefore, the actual noise level of the image signal that is obtained as a result of the sharpening process being performed by the second processing unit 108 becomes "10" and further, the actual level of the high frequency components of the image signal becomes "55".

Therefore, in a case when the image processing apparatus 100 sets the second control information based on the image information illustrated in FIG. 2A, that is, in a case when the first processing unit 106 and the second processing unit 108 are not coordinated, the sharpness of the image that the image signal represents is suppressed more than is necessary. Therefore, in a case when the first processing unit 106 and the second processing unit 108 are not coordinated as with the image processing apparatus of the related art with which a plurality of image processes are not able to be performed coordinated, there is a concern that the user notices the blurring of the image, and an improvement in the image quality is difficult.

On the other hand, since the image processing apparatus 100 sets the second control information by coordinating the first processing unit 106 and the second processing unit 108 as illustrated in FIG. 2C, it is possible to further lower the possibility that the user notices the blurring of the image as above, and an improvement in the image quality is possible.

Figure 4A:
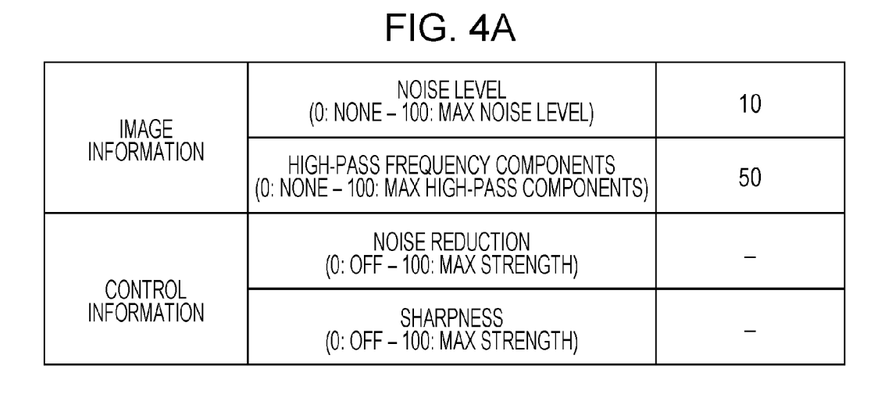
FIG. 4A is an explanatory diagram that illustrates another example of image information and control information according to the embodiments of the present disclosure.
Figure 4B:
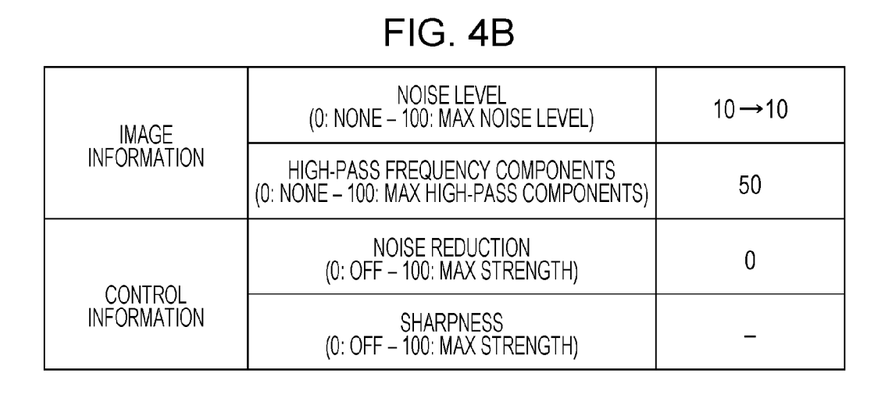
FIG. 4B is an explanatory diagram that illustrates another example of image information and control information according to the embodiments of the present disclosure.
Figure 4C:
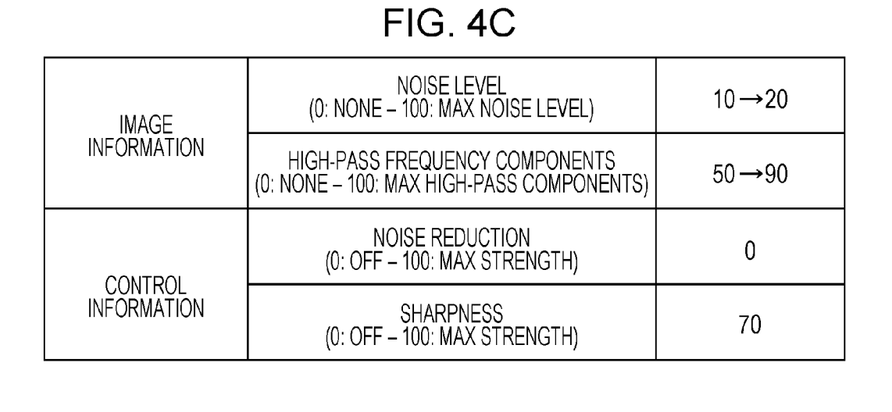
FIG. 4C is an explanatory diagram that illustrates another example of image information and control information according to the embodiments of the present disclosure.

Here, the processes of coordinating the first processing unit 106 and the second processing unit 108 in the image processing apparatus 100 according to the embodiments of the present disclosure are not limited to the examples illustrated in FIGS. 2A to 2C. Therefore, next, other examples of the processes of the image processing apparatus 100 will be described. FIGS. 4A to 4C are explanatory diagrams that illustrate other examples of the image information and the control information according to the embodiments of the present disclosure.

Similarly to FIG. 2A, FIG. 4A illustrates the image information and the control information that the information management unit 102 sets based on the analysis result that is transmitted from the analysis unit 104. In FIG. 4A, an example in which the noise level is set to "10" and the level of the high-pass frequency components is set to "50" as the image information is illustrated.

In a case when a noise reduction process is performed by the first processing unit 106, for a variety of reasons such as, for example, algorithms and the image quality setting policy, there may be a case in which a noise reduction process is not performed even if the noise is not "0". More specifically, such a case may occur due to, for example, a restriction by a user setting in a case when settings by the user are possible, the image setting policy, avoiding side effects of the performances of the image processing function according to the image quality, or the like. That is, in the image processing apparatus 100, even if noise is detected by the analysis unit 104, a noise reduction process is not necessarily performed by the first processing unit 106.

Since the noise level that the image information illustrated in FIG. 4A indicates is low at "10" and the level of the high-pass frequency components is somewhat high at "50", an example of a case when the image processing apparatus 100 places an emphasis on the sharpness of the image and a noise reduction process is not performed will be described. The information management unit 102 sets the first control information to "0" so that a noise reduction process is not performed by the first processing unit 106. Furthermore, the information management unit 102 updates the image information by estimating a state that relates to the image quality of the image that the image signal represents in a case when the first processing unit 106 performs a noise reduction process based on the set first control information. Here, since "0" is set as the first control information, the input image signal and the image signal that is transmitted from the first processing unit 106 to the second processing unit 108 are not changed. Therefore, the image information that is updated by the information management unit 102 illustrated in FIG. 4B and the image information illustrated in FIG. 4A indicate the same contents.

Further, since the information management unit 102 sets the second control information based on the set first control information, it is possible to set the second control information by interpreting the first control information which is "0" to mean "the input image signal had a low noise level to start with even without performing a noise reduction process". Therefore, even in a case when the image information illustrated in FIG. 4B indicates the same content as the image information illustrated in FIG. 2B, the information management unit 102 is able to set second control information that is different from FIG. 2C as illustrated in FIG. 4C from the difference with the set first control information. By the second control information illustrated in FIG. 4C being set, the second processing unit 108 performs a sharpening process that is stronger than a case when the second control information illustrated in FIG. 2C is used is used and the level of the high-pass frequency components is further improved. Therefore, in a case when there is little noise included in the input image signal to start with, the image processing apparatus 100 is able to improve image quality by increasing the sharpness within a range in which the noise does not become noticeable.

The image processing apparatus 100 coordinates, for example, by the configuration illustrated in FIG. 1, a plurality of image processes while an image process is performed according to the analysis result of analyzing the input image signal. Therefore, since the image processing apparatus 100 takes the effect that one image process has on other image process at latter stages into consideration and it is possible to perform the process of latter stages by estimating the state of the image signal after each image process, it is possible to further optimize the image process for improving the image quality than a case when the technique of the related art is used or a case when the image processing apparatus of the related art is used.

Further, by the configuration illustrated in FIG. 1, for example, since the first processing unit 106 and the second processing unit 108 perform processes using the control information that is appropriately set by the information management unit 102, it is possible to change the degree of the image processes using the result of the process of other functions (analysis function or image processing function). Therefore, by the configuration illustrated in FIG. 1, since the image processing apparatus 100 is able to change the contents of the image process by the scene even in a case when the input image signal represents a moving image, the image quality is able to be further improved.

Therefore, by the configuration illustrated in FIG. 1, for example, the image processing apparatus 100 is able to improve image quality in a case when a plurality of image processes are performed on an image signal.

MODIFIED EXAMPLES OF IMAGE PROCESSING APPARATUS ACCORDING TO EMBODIMENTS OF PRESENT DISCLOSURE

[1] First Modified Example

Figure 5:
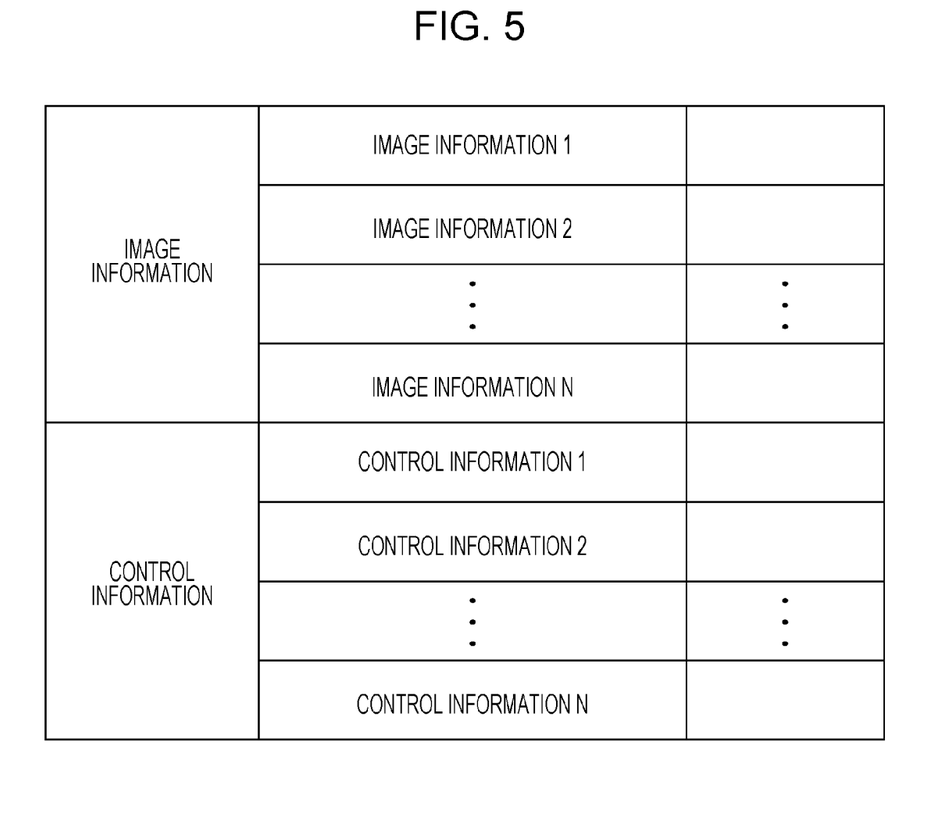
FIG. 5 is an explanatory diagram that illustrates another examples of image information and control information according to the embodiments of the present disclosure.

Here, the configuration of the image processing apparatus 100 according to the embodiments of the present disclosure is not limited to the configuration illustrated in FIG. 1. For example, the image processing apparatus 100 according to the embodiments of the present disclosure may further include one or two or more processing units at a latter stage of the second processing unit 108 illustrated in FIG. 1. Even with the above configuration, similarly to the image processing apparatus 100 illustrated in FIG. 1, the image processing apparatus 100 according to a first modified example of the embodiments of the present disclosure is able to perform an image process according to the analysis result of analyzing the input image signal and to coordinate a plurality of image processes by the information management unit 102 updating as appropriate the image information and the control information as illustrated in FIG. 5, for example, similarly to the image processing apparatus 100 illustrated in FIG. 1. Here, FIG. 5 is an explanatory diagram that illustrates other examples of the image information and the control information according to the embodiments of the present disclosure. N (N is an integer equal to or greater than 3) illustrated in FIG. 5 indicates the number of processing units that the image processing apparatus 100 according to the first modified example of the embodiments of the present disclosure includes.

Therefore, similarly to the image processing apparatus 100 illustrated in FIG. 1, the image processing apparatus 100 according to the first modified example of the embodiments of the present disclosure is able to improve image quality in a case when a plurality of image processes are performed on an image signal.

[2] Second Modified Example

Figure 6:
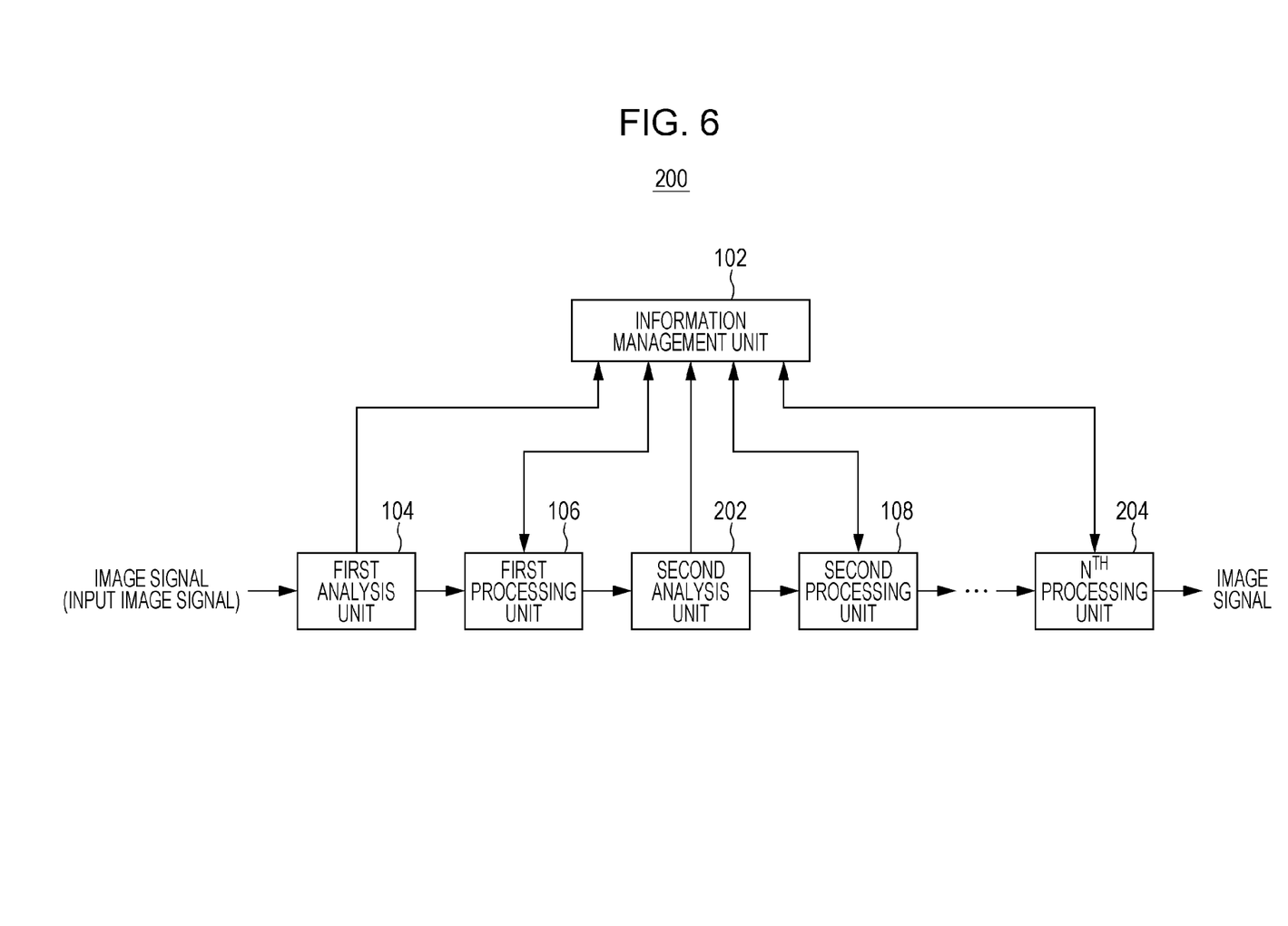
FIG. 6 is an explanatory diagram that illustrates another example of a configuration of an image processing apparatus according to the embodiments of the present disclosure.

Further, the configuration of the image processing apparatus 100 according to the embodiments of the present disclosure is not limited to the configuration of including one analysis unit 104 as illustrated in FIG. 1. FIG. 6 is an explanatory diagram that illustrates another example of a configuration of the image processing apparatus 100 according to the embodiments of the present disclosure, and illustrates an example of a configuration of an image processing apparatus 200 according to a second modified example. In FIG. 6, a configuration in which the image processing apparatus 200 includes N processing units (first processing unit 106, second processing unit 108, . . . Nth processing unit 204) and includes a second analysis unit 202 between the first processing unit 106 and the second processing unit 108 is illustrated.

For example, as with the image processing apparatus 200 according to the modified example illustrated in FIG. 6, the image processing apparatus 100 according to the second modified example of the embodiments of the present disclosure is able to include an arbitrary number of analysis units and a plurality of processing units by an arbitrary configuration. Further, in a case when an arbitrary number of analysis units and a plurality of processing units are included by an arbitrary configuration as with the image processing apparatus 200 according to the modified example illustrated in FIG. 6, for example, the information management unit 102 updates as appropriate the image information and the control information illustrated in FIG. 5, for example, similarly to the image processing apparatus 100 illustrated in FIG. 1.

Therefore, similarly to the image processing apparatus 100 illustrated in FIG. 1, the image processing apparatus 100 according to the second modified example of the embodiments of the present disclosure is able to improve image quality in a case when a plurality of image processes are performed on the image signal.

As above, the image processing apparatus 100 according to the embodiments of the present disclosure coordinates a plurality of image processes while performing image processes according to the analysis result of analyzing the input image signal. Therefore, since the image processing apparatus 100 takes the effect that one image process has on other image process at latter stages into consideration and it is possible to perform the process of latter stages by estimating the state of the image signal after each image process, it is possible to further optimize the image process for improving the image quality than a case when the technique of the related art is used or a case when the image processing apparatus of the related art is used.

Further, since each of the processing units of the image processing apparatus 100 performs a process using the control information that is set as appropriate by the information management unit 102, it is possible to change the degree of image process using the result of processes by other functions (analysis function or image processing function). Therefore, since the image processing apparatus 100 is able to change the contents of the image process by the scene even in a case when the input image signal represents a moving image, the image quality is able to be further improved.

Therefore, the image processing apparatus 100 is able to improve image quality in a case when a plurality of image processes are performed on the image signal.

Further, the image processing apparatus 100 is also able to generate separate image information and control information for each update when updating the image information and the control information. Therefore, since the image processing apparatus 100 is able to manage the changes in the image information by numerical values, the image quality setting may be aided. Further, for example, by presenting the changes in the image information as a graph or the like to the user of the image processing apparatus 100, the image processing apparatus 100 is able to notify of the control contents of the image processes relating to improving the image quality in the image processing apparatus 100 to be more easily understandable to the user. Therefore, by managing the changes in the image information by numerical values, the image processing apparatus 100 is able to improve the convenience to the user.

Although the image processing apparatus 100 has been exemplified above as an embodiment of the present disclosure, the embodiments of the present disclosure are not limited to such a form. The embodiments of the present disclosure are able to be applied to a variety of apparatuses with which processes of the image signal are possible such as, for example, a computer such as a PC (Personal Computer) or a PDA (Personal Digital Assistant), a display apparatus such as a television set, a mobile communication apparatus such as a mobile phone, a video and music reproduction apparatus (or a video and music recording reproduction apparatus), or a games console.

Program According to Embodiment of Present Disclosure

It is possible to improve image quality in a case when a plurality of image processes are performed on an image signal by a program for causing a computer to function as an image processing apparatus according to the embodiment of the present disclosure (for example, a program for realizing the processing according to the image processing method according to the embodiments of the present disclosure).

Although favorable embodiments of the present disclosure have been described above with reference to the drawings, needless to say, the embodiments of the present disclosure are not limited to such examples. It is clear that those skilled in the art may conceive of various modified examples or corrective examples within the gist of the scope of the present disclosure, and such examples are naturally understood to belong within the technical scope of the embodiments of the present disclosure.

For example, although a program (computer program) for causing a computer to function as the image processing apparatus according to the embodiments of the present disclosure has been provided above, with the embodiments of the present disclosure, it is possible to provide a recording medium on which the above program is respectively stored together.

The configuration described above is an example of the embodiments of the present disclosure, and naturally, belong within the technical scope of the embodiments of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   an information management circuit that manages image information that indicates a state relating to image quality of an image that an image signal represents and control information for each image process which regulates a degree of an image process;
   an analysis circuit that analyzes an input image signal that is input;
   a first processing circuit that performs a first image process on the input image signal based on first control information that is the corresponding control information; and
   a second processing circuit that performs a second image process on an image signal on which the first processing circuit has performed an image process based on second control information that is the corresponding control information,
   wherein the information management circuit
   sets image information that corresponds to the input image signal and the first control information based on an analysis result by the analysis circuit,
   updates the image information based on the set first control information to obtain updated image information, and
   sets the second control information based on the updated image information and the first control information, in which the second control information is different from the first control information,
   such that (i) the first control information is set based on a state of image quality of the input signal and (ii) the second control information is set based on a state of image quality after completion of the first image process and not based on the state of the image quality of the input signal.

2. The image processing apparatus according to claim 1, wherein the information management circuit updates the image information based on the set second control information.

3. The image processing apparatus according to claim 2, further comprising a third processing circuit that perform an image process on an image signal on which the second processing circuit has performed an image process based on the corresponding control information.

4. The image processing apparatus according to claim 1, in which the first image process is a noise reduction process and the second image process is a sharpening process.

5. The image processing apparatus according to claim 4, in which the first control information pertains to an amount of noise reduction to be performed by the first image or noise reduction process, and the second control information pertains to a strength of sharpness to be performed by the second image or sharpness process.

6. An image processing method comprising:
   analyzing an input image signal that is input;
   setting image information that corresponds to the input image signal and indicates a state relating to an image quality of an image that an image signal represents and first control information that regulates a degree of a first image process based on an analysis result in the analyzing of the input image signal;
   performing a first image process on the input image signal based on the set first control information;
   updating the image information based on the set first control information;
   setting second control information that regulates a degree of a second image process based on the updated image information and the first control information; and
   performing a second image process on an image signal on which the first image process has been performed based on set second control information,
   in which the second control information is different from the first control information, and
   in which (i) the first control information is set based on a state of image quality of the input signal and (ii) the second control information is set based on a state of image quality after completion of the first image process and not based on the state of the image quality of the input signal.

7. A non-transitory computer-readable medium having stored thereon a program for causing a computer to function as:
   an information management unit that manages image information that indicates a state relating to an image quality of an image that an image signal represents and control information for each image process which regulates a degree of an image process;
   an analysis unit that analyzes an input image signal that is input;
   a first processing unit that performs a first image process on the input image signal based on first control information that is the corresponding control information; and
   a second processing unit that performs a second image process on an image signal on which the first processing unit has performed an image process based on second control information that is the corresponding control information,
   wherein the information management unit
   sets image information that corresponds to the input image signal and the first control information based on an analysis result by the analysis unit,
   updates the image information based on the set first control information, and
   sets the second control information based on the updated image information and the first control information, in which the second control information is different from the first control information,
   such that (i) the first control information is set based on a state of image quality of the input signal and (ii) the second control information is set based on a state of image quality after completion of the first image process and not based on the state of the image quality of the input signal.

\* \* \* \* \*